US012391308B2

(12) United States Patent
Liu et al.

(10) Patent No.: US 12,391,308 B2
(45) Date of Patent: Aug. 19, 2025

(54) FALSE POSITIVE REQUEST DETECTION

(71) Applicant: Toyota Jidosha Kabushiki Kaisha, Toyota (JP)

(72) Inventors: Yiting Liu, Dublin, CA (US); Hirofumi Yamamoto, Cupertino, CA (US); Chen Bao, Newark, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 84 days.

(21) Appl. No.: 18/236,982

(22) Filed: Aug. 23, 2023

(65) Prior Publication Data

US 2025/0065944 A1 Feb. 27, 2025

(51) Int. Cl.
*B62D 5/04* (2006.01)
(52) U.S. Cl.
CPC ............ *B62D 5/0484* (2013.01); *B62D 5/049* (2013.01)
(58) Field of Classification Search
CPC ............................. B62D 5/0484; B62D 5/049
See application file for complete search history.

(56) References Cited

U.S. PATENT DOCUMENTS

| | | | | |
|---|---|---|---|---|
| 4,043,526 A | * | 8/1977 | Donley ................ | G05D 1/0077 318/563 |
| 4,625,822 A | * | 12/1986 | Nakamura ............. | B62D 7/159 180/415 |
| 4,705,135 A | * | 11/1987 | Kawamoto .......... | B62D 7/1545 701/41 |
| 5,181,173 A | * | 1/1993 | Avitan ..................... | B62D 6/02 701/42 |
| 5,249,638 A | * | 10/1993 | Watanabe ............ | B62D 5/0442 180/404 |
| 5,259,473 A | * | 11/1993 | Nishimoto ........... | B62D 5/0493 701/43 |
| 5,386,365 A | * | 1/1995 | Nagaoka ................ | B62D 7/159 701/44 |

(Continued)

FOREIGN PATENT DOCUMENTS

| | | | | |
|---|---|---|---|---|
| CN | 104995081 A | * | 10/2015 | ........... B62D 5/0466 |
| CN | 116661443 A | * | 8/2023 | |

(Continued)

OTHER PUBLICATIONS

"Driver Intervention Detection via Real-Time Transfer Function Estimation;" Schinkel et al., IEEE Transactions on Intelligent Transportation Systems (vol. 22, Issue: 2, 2021, pp. 772-781); Dec. 10, 2019. (Year: 2019).*

(Continued)

*Primary Examiner* — Khoi H Tran
*Assistant Examiner* — Jorge O Peche
(74) *Attorney, Agent, or Firm* — Christopher G. Darrow; Darrow Mustafa PC

(57) ABSTRACT

Systems, methods, and other embodiments described herein relate to detecting a false positive request to disengage a vehicle control system. In one embodiment, a method includes detecting a false positive request to disengage a vehicle control system based on a difference between a road wheel angle input and an angle of a road wheel controlled by the road wheel angle input and preventing the vehicle control system from disengaging based on detecting the false positive request.

20 Claims, 5 Drawing Sheets

(56) References Cited

U.S. PATENT DOCUMENTS

| | | | | |
|---|---|---|---|---|
| 5,483,446 A * | 1/1996 | Momose | B62D 7/159 | 701/1 |
| 5,754,966 A * | 5/1998 | Ichikawa | B62D 7/159 | 701/41 |
| 5,803,202 A * | 9/1998 | Bohner | B62D 5/005 | 180/443 |
| 5,954,774 A * | 9/1999 | Jung | B62D 7/159 | 701/41 |
| 6,089,680 A * | 7/2000 | Yoshioka | B60T 8/1755 | 303/146 |
| 6,129,025 A * | 10/2000 | Minakami | B60L 13/03 | 104/88.01 |
| 6,266,594 B1 * | 7/2001 | Ishikawa | B66F 17/003 | 177/136 |
| 6,279,673 B1 * | 8/2001 | Bohner | B62D 15/025 | 180/417 |
| 6,381,527 B1 * | 4/2002 | Furumi | B62D 5/0442 | 701/41 |
| 6,481,526 B1 * | 11/2002 | Millsap | B62D 5/006 | 180/402 |
| 6,542,801 B2 * | 4/2003 | Kawashima | B62D 6/001 | 318/432 |
| 6,896,089 B2 * | 5/2005 | Mills | B62D 5/001 | 180/402 |
| 6,938,720 B2 * | 9/2005 | Menjak | B60R 21/205 | 180/402 |
| 7,051,827 B1 * | 5/2006 | Cardinal | B60T 7/14 | 180/174 |
| 7,278,509 B2 * | 10/2007 | Schroder | B66F 9/07568 | 280/89 |
| 7,392,122 B2 * | 6/2008 | Pillar | B65F 3/043 | 701/41 |
| 8,565,978 B2 * | 10/2013 | Elkins | A01B 69/008 | 701/44 |
| 9,238,407 B1 * | 1/2016 | Brito | B60W 30/14 | |
| 9,505,430 B2 * | 11/2016 | Burcar | B62D 6/10 | |
| 10,481,602 B2 | 11/2019 | Chandy | | |
| 11,518,415 B2 | 12/2022 | Voigt | | |
| 11,699,347 B2 * | 7/2023 | Chen | B60W 50/045 | 701/301 |
| 12,187,310 B2 * | 1/2025 | Okuhara | B60W 10/18 | |
| 2003/0114970 A1 * | 6/2003 | Hara | B62D 5/008 | 180/443 |
| 2004/0158377 A1 * | 8/2004 | Matsumoto | B62D 15/025 | 701/70 |
| 2005/0234622 A1 * | 10/2005 | Pillar | G08G 1/20 | 701/41 |
| 2006/0074538 A1 * | 4/2006 | Bauer | B62D 15/0265 | 701/41 |
| 2006/0080016 A1 * | 4/2006 | Kasahara | B62D 6/008 | 701/41 |
| 2009/0319117 A1 * | 12/2009 | Nakane | B62D 5/0484 | 701/31.4 |
| 2010/0004817 A1 * | 1/2010 | Nakane | B62D 6/10 | 701/33.4 |
| 2010/0286862 A1 * | 11/2010 | Fox | G01C 21/3688 | 701/31.4 |
| 2012/0109463 A1 * | 5/2012 | Elkins | B62D 15/0215 | 701/42 |
| 2013/0096778 A1 * | 4/2013 | Goto | B62D 5/008 | 701/41 |
| 2013/0197762 A1 * | 8/2013 | Schuberth | B62D 5/008 | 701/42 |
| 2014/0180544 A1 * | 6/2014 | Itamoto | B62D 6/00 | 701/41 |
| 2015/0259880 A1 * | 9/2015 | Sharma | E02F 9/2025 | 701/43 |
| 2015/0259881 A1 * | 9/2015 | Sharma | B62D 12/00 | 701/50 |
| 2015/0274202 A1 * | 10/2015 | Tsunoda | B62D 5/04 | 180/446 |
| 2016/0009318 A1 * | 1/2016 | Morotomi | B62D 15/0265 | 701/41 |
| 2016/0039455 A1 * | 2/2016 | Zeller | B62D 6/001 | 701/41 |
| 2016/0185216 A1 * | 6/2016 | Clarke | B60K 17/35 | 74/665 F |
| 2016/0187888 A1 * | 6/2016 | Turner | B60D 1/62 | 701/49 |
| 2016/0231743 A1 * | 8/2016 | Bendewald | B60K 35/22 | |
| 2016/0244070 A1 * | 8/2016 | Bendewald | B62D 1/181 | |
| 2018/0022383 A1 * | 1/2018 | Kunihiro | B62D 7/159 | 701/41 |
| 2018/0043878 A1 * | 2/2018 | Khafagy | B60W 20/20 | |
| 2018/0088661 A1 * | 3/2018 | Betancourt | G06F 3/0227 | |
| 2018/0201262 A1 * | 7/2018 | Yoon | B60W 10/10 | |
| 2018/0326990 A1 * | 11/2018 | Kusaka | B60W 10/18 | |
| 2018/0348768 A1 * | 12/2018 | Prasad | G05D 1/0257 | |
| 2019/0054915 A1 * | 2/2019 | Noonan | B60T 7/042 | |
| 2019/0089288 A1 * | 3/2019 | Koseki | H02P 29/032 | |
| 2019/0130898 A1 * | 5/2019 | Tzirkel-Hancock | G10L 15/22 | |
| 2019/0256096 A1 * | 8/2019 | Graf | G08G 1/096725 | |
| 2020/0001869 A1 * | 1/2020 | Lotz | B60W 30/143 | |
| 2020/0031283 A1 * | 1/2020 | Nakasho | G08G 1/16 | |
| 2020/0079394 A1 * | 3/2020 | Masuda | B60R 21/00 | |
| 2020/0189591 A1 * | 6/2020 | Mellinger, III | B62D 6/003 | |
| 2021/0031765 A1 * | 2/2021 | Poulin | B60W 30/146 | |
| 2021/0031782 A1 * | 2/2021 | Poulin | B60W 40/09 | |
| 2021/0061348 A1 * | 3/2021 | Araki | B62D 61/08 | |
| 2021/0080967 A1 * | 3/2021 | Pettinger | B60W 30/06 | |
| 2021/0337715 A1 * | 11/2021 | Fujimoto | G05D 1/223 | |
| 2021/0370936 A1 * | 12/2021 | Bhatnagar | B60W 30/16 | |
| 2021/0370940 A1 * | 12/2021 | Tejeda | B60W 50/0205 | |
| 2022/0017079 A1 * | 1/2022 | Kakeshita | G06V 20/58 | |
| 2022/0017080 A1 * | 1/2022 | Moriya | B60W 30/09 | |
| 2022/0105769 A1 * | 4/2022 | Chetty | B60G 17/0162 | |
| 2022/0119016 A1 * | 4/2022 | Rajvanshi | B60W 60/0059 | |
| 2022/0194469 A1 * | 6/2022 | Atmeh | B60W 60/0011 | |
| 2022/0203998 A1 * | 6/2022 | Hosoya | G05D 1/027 | |
| 2022/0204002 A1 * | 6/2022 | Hosoya | G05D 1/027 | |
| 2022/0234606 A1 * | 7/2022 | Okuhara | B60W 10/18 | |
| 2022/0291395 A1 * | 9/2022 | Iyengar | H01Q 9/42 | |
| 2022/0317312 A1 * | 10/2022 | Sharma | H04W 4/40 | |
| 2022/0324486 A1 * | 10/2022 | Berghöfer | B60W 30/09 | |
| 2022/0324511 A1 | 10/2022 | Veeramurthy et al. | | |
| 2023/0000004 A1 * | 1/2023 | Schaefer | A01B 69/008 | |
| 2023/0010007 A1 * | 1/2023 | Wang | B60W 50/082 | |
| 2023/0071236 A1 * | 3/2023 | Shi | G01C 21/367 | |
| 2023/0097251 A1 * | 3/2023 | Adams | B60W 50/0205 | 701/29.2 |
| 2023/0227151 A1 * | 7/2023 | Gauci | B64C 13/0421 | 701/3 |
| 2023/0303062 A1 * | 9/2023 | Krekel | B62D 15/0285 | |
| 2024/0310176 A1 * | 9/2024 | Yin | G08G 1/01 | |

FOREIGN PATENT DOCUMENTS

| | | | | |
|---|---|---|---|---|
| DE | 19502484 A1 * | 9/1995 | | B62D 15/0225 |
| DE | 102011086897 A1 * | 5/2013 | | B62D 15/025 |
| EP | 0510365 A2 * | 10/1992 | | |
| EP | 0350019 B1 * | 6/1994 | | |
| EP | 2070740 A1 * | 6/2009 | | B60C 11/00 |
| GB | 2496975 A * | 5/2013 | | B60R 21/0132 |
| JP | H06263048 A * | 9/1994 | | |
| JP | 2982389 B2 * | 11/1999 | | |
| JP | 3071319 B2 * | 7/2000 | | B62D 5/0466 |
| JP | 2003040132 A * | 2/2003 | | |
| JP | 2004224238 A * | 8/2004 | | |
| RU | 2577809 C2 * | 3/2016 | | B60W 10/06 |
| WO | WO-2020150522 A1 * | 7/2020 | | B60G 17/0162 |

OTHER PUBLICATIONS

"Evaluation of Teleoperation Concepts to solve Automated Vehicle Disengagements;" Brecht et al., ARXIV ID: 2404. 15030; Apr. 23, 2024. (Year: 2024).*

"Looking ahead: Anticipatory interfaces for driver-automation collaboration;" Johns et al., 2017 IEEE 20th International Conference

(56) References Cited

OTHER PUBLICATIONS on Intelligent Transportation Systems (ITSC) (2017, pp. 1-7); Apr. 6, 2018. (Year: 2018).*

* cited by examiner

FALSE POSITIVE REQUEST DETECTION

TECHNICAL FIELD

The subject matter described herein relates, in general, to systems and methods for detecting a false positive request to disengage a vehicle control system.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some vehicles are equipped with one or more vehicle control systems such as a lane keeping assist system and an adaptive cruise control system. These vehicle control systems can be activated or deactivated using vehicle systems. As an example, the vehicle control systems can be deactivated using a braking system, a throttle system, or a steering system.

SUMMARY

This section generally summarizes the disclosure and is not a comprehensive explanation of its full scope or all its features.

In one embodiment, a method for detecting a false positive request to disengage a vehicle control system is disclosed. The method includes detecting a false positive request to disengage a vehicle control system based on a difference between a road wheel angle input and an angle of a road wheel controlled by the road wheel angle input and preventing the vehicle control system from disengaging based on detecting the false positive request.

In another embodiment, a system for detecting a false positive request to disengage a vehicle control system is disclosed. The system includes a processor and a memory in communication with the processor. The memory stores machine-readable instructions that, when executed by the processor, cause the processor to detect a false positive request to disengage a vehicle control system based on a difference between a road wheel angle input and an angle of a road wheel controlled by the road wheel angle input and prevent the vehicle control system from disengaging based on detecting the false positive request.

In another embodiment, a non-transitory computer-readable medium for detecting a false positive request to disengage a vehicle control system and including instructions that, when executed by a processor, cause the processor to perform one or more functions, is disclosed. The instructions include instructions to detect a false positive request to disengage a vehicle control system based on a difference between a road wheel angle input and an angle of a road wheel controlled by the road wheel angle input and prevent the vehicle control system from disengaging based on detecting the false positive request.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
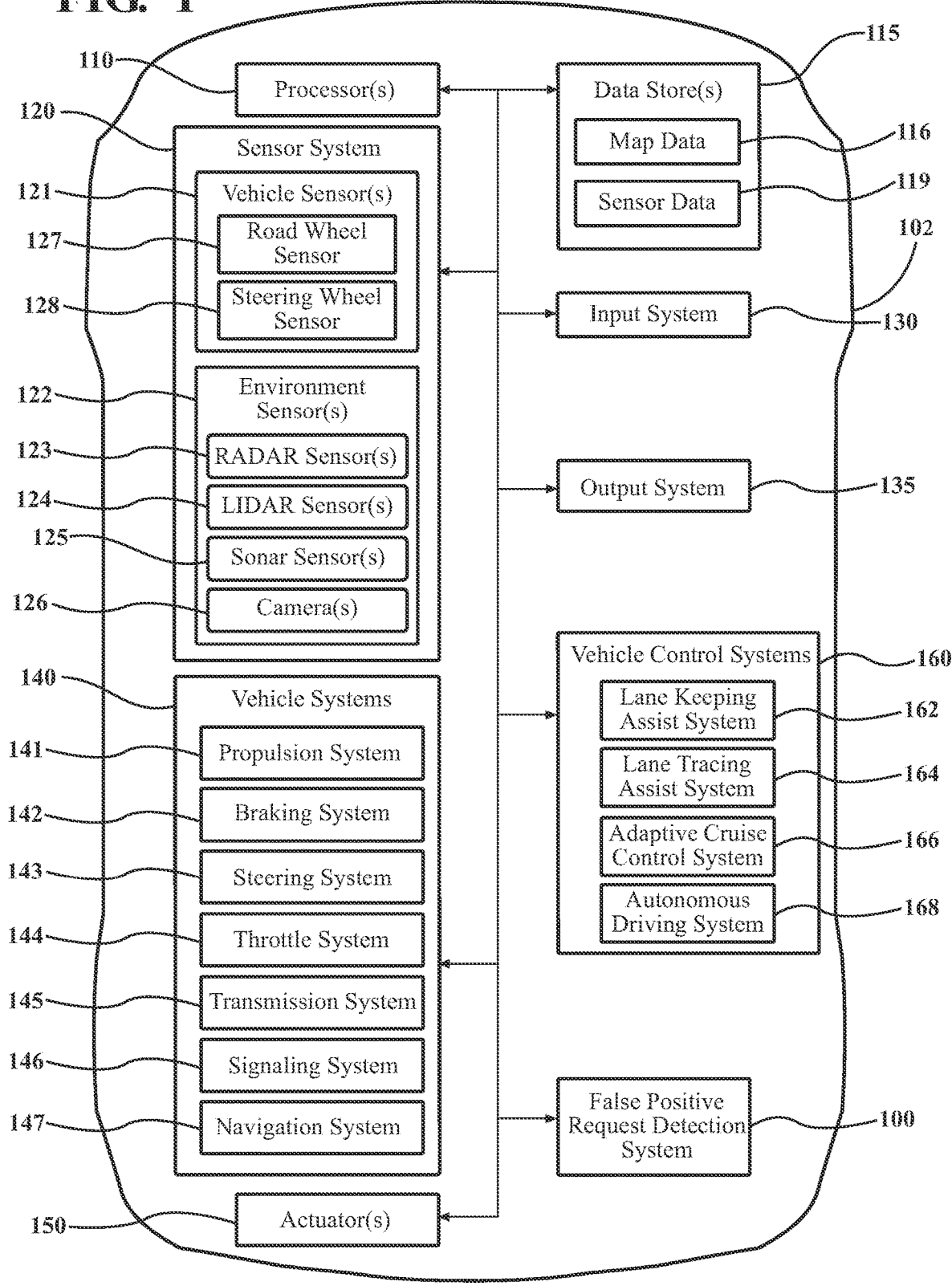
FIG. 1 illustrates a block diagram of a vehicle incorporating a false positive request detection system.

Systems, methods, and other embodiments associated with detecting a false positive request to disengage a vehicle control system, are disclosed. A vehicle can be controlled using various vehicle control systems such as a lane keeping assist system, a lane tracing assist system, an autonomous vehicle control system, an autopilot system, and/or an adaptive cruise control system. Vehicle control systems can be activated or deactivated using vehicle systems such as a braking system, a throttle system, or a steering system.

Vehicle control systems that can be deactivated or disengaged using the steering system may be inadvertently disengaged when, as an example, a road wheel of the vehicle turns sharply in response to a bump in the road. An unplanned disengagement of a vehicle control system may result in the control of the vehicle being handed over to an unaware and unprepared operator, which can be dangerous. As such, the road wheel turning may trigger a false positive request to disengage the vehicle control system(s). In a case where not explicitly disclosed, the road wheel turning, the angle of the road wheel, and the rate of change of the angle of the road wheel in this disclosure are relative to the longitudinal axis of the vehicle.

Current methods are unable to detect a false positive request. As such, current methods, in response to the road wheel turning, may require user confirmation before disengagement. In other cases, the current methods may issue an alarm such as an audio alarm or visual alarm indicating that the road wheel turned and triggered the disengagement of the vehicle control system(s). Current methods may utilize torque to detect intervention which is not reliable and result in a high false positive rate.

Accordingly, in one embodiment, the disclosed approach is a system that detects a false positive request to disengage a vehicle control system and prevents the vehicle control system from disengaging based on detecting the false positive request. As an example, the system includes a road wheel sensor that monitors the angle of the road wheel and the rate of change of the angle of the road wheel relative to the longitudinal axis of the vehicle. The system includes a steering wheel sensor that monitors the angle of the steering wheel and the rate of change of the angle of the steering wheel. The system continually monitors the road wheel and the steering wheel by requesting sensor data relating to the angle of the road wheel, the rate of change of the angle of the road wheel, the angle of the steering wheel, and the rate of change of the angle of the steering wheel. In response to the road wheel turning, the system may first determine whether the rate of the change of the angle exceeds a predetermined threshold value. In other words, the system determines whether the road wheel made a sharp turn that may trigger a request to disengage the vehicle control system. The system may then compare the difference between the angle of the road wheel and the angle of the steering wheel with a second predetermined threshold value. In the case that the difference does not exceed the second predetermined threshold value (i.e., the difference is between the predetermined threshold value and the second predetermined threshold value), the system may conclude that the road wheel turned due to a bump or a pothole in the road and not due to the rotation of the steering wheel. The system may then determine that the turning of the road wheel was not a disengagement request. In the case that the difference exceeds the second predetermined threshold, the system may conclude that the road wheel turned in response to the rotation of the steering wheel and as such, the turning of the road wheel was a disengagement request.

In one embodiment, the system may compare the difference between the rate of change of the angle of the road wheel and the rate of change of the angle of the steering wheel with a third predetermined threshold value. As such, the system may determine whether the road wheel turned faster and perhaps before the steering wheel rotated. In a case where the difference exceeds the third predetermined threshold value, the system may conclude that the road wheel turned due to a bump or a pothole in the road and not due to the rotation of the steering wheel. The system may then determine that the turning of the road wheel was not a disengagement request. In the case that the difference does not exceed the third predetermined threshold, the system may conclude that the road wheel turned in response to the rotation of the steering wheel and as such, the turning of the road wheel was a disengagement request.

The system may detect a false positive request using the angle of the road wheel and the angle of the steering wheel. Additionally and/or alternatively, the system may detect a false positive request using the rate of change of the angle of the road wheel and the rate of change of the angle of the steering wheel.

The embodiments disclosed herein present various advantages over the current methods. First, the embodiments detect false positive requests with higher accuracy than the current methods. Second, the embodiments reduce unexpected disengagement of a vehicle control system. Third, the embodiments utilize sensors and do not require extensive hardware or computing resources.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, a block diagram of a vehicle 102 incorporating a false positive request detection system 100 is illustrated. The vehicle 102 includes various elements. It will be understood that in various embodiments, it may not be necessary for the vehicle 102 to have all of the elements shown in FIG. 1. The vehicle 102 can have any combination of the various elements shown in FIG. 1. Further, the vehicle 102 can have additional elements to those shown in FIG. 1. In some arrangements, the vehicle 102 may be implemented without one or more of the elements shown in FIG. 1. While the various elements are shown as being located within the vehicle 102 in FIG. 1, it will be understood that one or more of these elements can be located external to the vehicle 102. Further, the elements shown may be physically separated by large distances. For example, as discussed, one or more components of the disclosed system can be implemented within a vehicle while further components of the system can be implemented within a cloud-computing environment.

Some of the possible elements of the vehicle 102 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 1, the vehicle 102 includes a false positive request detection system 100 that is implemented to perform methods and other functions as disclosed herein relating to detecting a false positive request to disengage a vehicle control system. As an example, the false positive request detection system 100, in various embodiments, may be implemented partially within the vehicle 102 and may further exchange communications with additional aspects of the false positive request detection system 100 that are remote from the vehicle 102 in support of the disclosed functions. Thus, while FIG. 2 generally illustrates the false positive request detection system 100 as being self-contained, in various embodiments, the false positive request detection system 100 may be implemented within multiple separate devices some of which may be remote from the vehicle 102.

The vehicle 102 can include one or more vehicle control systems 160. The vehicle control system 160 can include one or more devices, applications, and/or combinations thereof, now known or later developed, configured to control the movement, speed, maneuvering, heading, direction, etc. of the vehicle 102. The vehicle control systems 160 can include one or more driver assistance systems such as a lane keeping assist system 162, a lane tracing assist system 164, an adaptive cruise control system 166, an autonomous driving system 168, a lane centering system, a collision avoidance system, and/or a driver monitoring system. As an example, a vehicle control system 160 can control the steering of the vehicle 102 by generating a road wheel angle input and sending the road wheel angle input to the wheel(s) of the vehicle 102. The vehicle control system 160 may generate and send the road wheel angle input using an electronic control unit (ECU). Additionally and/or alternatively, the vehicle control system 160 may take control of the steering wheel in the vehicle 102 and control the rotation of the steering wheel to steer the vehicle 102. The vehicle control systems 160 may be disengaged by turning the steering wheel such that the road wheels of the vehicle 102 rotate along the longitudinal axis of the vehicle 102.

The vehicle 102 can include a sensor system 120. The sensor system 120 can include one or more vehicle sensors 121. The vehicle sensor(s) 121 can detect, determine, and/or sense information about the vehicle 102 itself. In one or more arrangements, the vehicle sensor(s) 121 can be configured to detect, and/or sense position and orientation changes of the vehicle 102, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), and/or other suitable sensors. The vehicle sensor(s) 121 can be configured to detect, and/or sense one or more characteristics of the vehicle 102. In one or more arrangements, the vehicle sensor(s) 121 can include a road wheel sensor 127 for detecting an angle and/or a rate of change of the angle of a road wheel of the vehicle 102 relative to the longitudinal axis of the vehicle 102. In one or more arrangements, the vehicle sensor(s) 121 can include a steering wheel sensor 128 for detecting an angle and/or a rate of change of the angle of a steering wheel of the vehicle 102 relative to the longitudinal axis of the vehicle 102.

Figure 2:
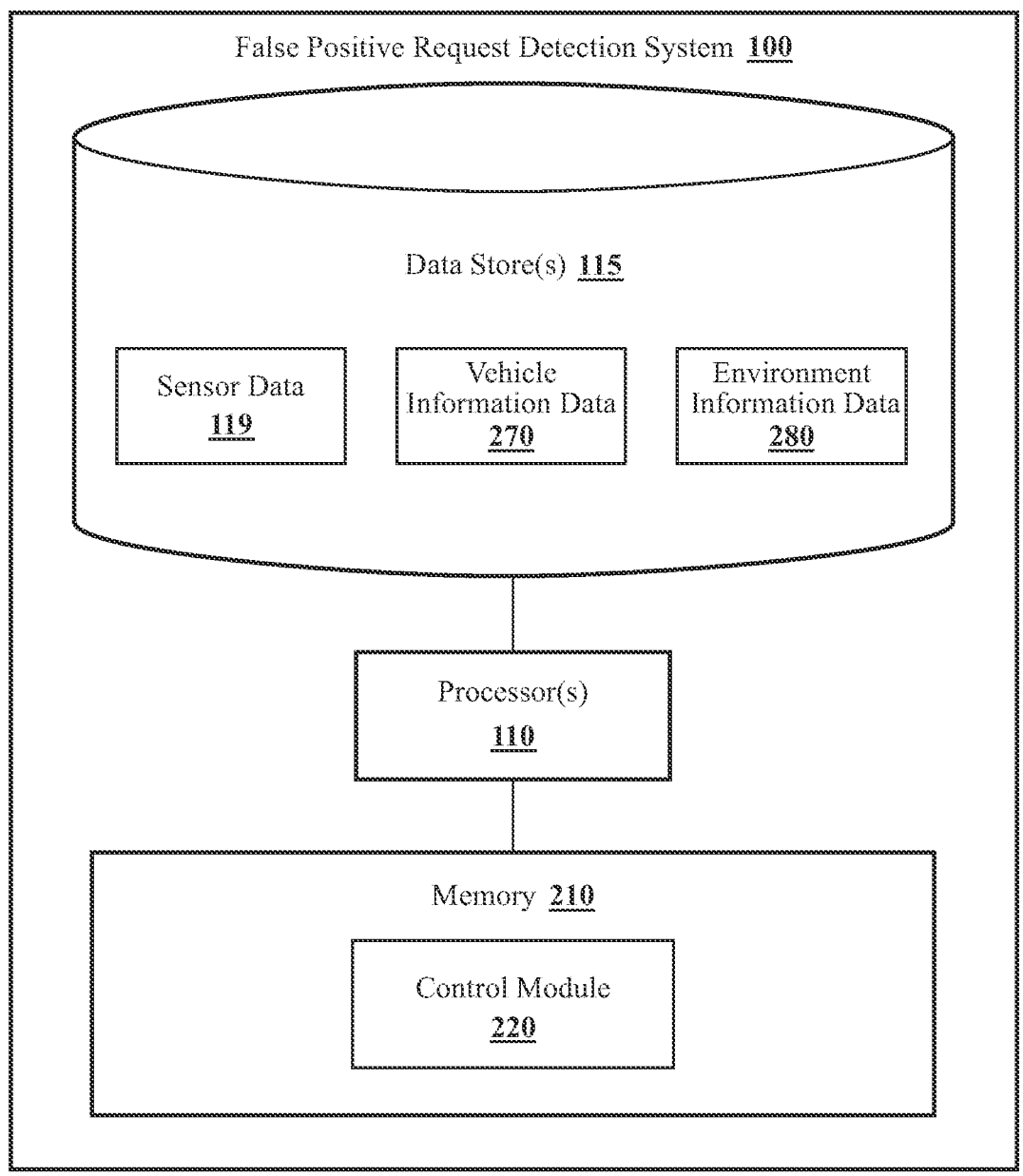
FIG. 2 is a more detailed block diagram of the false positive request detection system of FIG. 1.

With reference to FIG. 2, a more detailed block diagram of the false positive request detection system 100 is shown. The false positive request detection system 100 may include a processor(s) 110. Accordingly, the processor(s) 110 may be a part of the false positive request detection system 100, or the false positive request detection system 100 may access the processor(s) 110 through a data bus or another communication pathway. In one or more embodiments, the processor(s) 110 is an application-specific integrated circuit that may be configured to implement functions associated with a control module 220. More generally, in one or more aspects, the processor(s) 110 is an electronic processor, such as a microprocessor that can perform various functions as described herein when loading the control module and executing encoded functions associated therewith.

The false positive request detection system 100 may include a memory 210 that stores the control module 220. The memory 210 may be a random-access memory (RAM), read-only memory (ROM), a hard disk drive, a flash memory, or other suitable memory for storing the control module 220. The control module 220 includes, for example, computer-readable instructions that, when executed by the processor(s) 110, cause the processor(s) 110 to perform the various functions disclosed herein. While, in one or more embodiments, the control module 220 is a set of instructions embodied in the memory 210, in further aspects, the control module 220 includes hardware, such as processing components (e.g., controllers), circuits, etc. for independently performing one or more of the noted functions.

The false positive request detection system 100 may include a data store(s) 115 for storing one or more types of data. Accordingly, the data store(s) 115 may be a part of the false positive request detection system 100, or the false positive request detection system 100 may access the data store(s) 115 through a data bus or another communication pathway. The data store(s) 115 is, in one embodiment, an electronically based data structure for storing information. In at least one approach, the data store 115 is a database that is stored in the memory 210 or another suitable medium, and that is configured with routines that can be executed by the processor(s) 110 for analyzing stored data, providing stored data, organizing stored data, and so on. In either case, in one embodiment, the data store 115 stores data used by the control module 220 in executing various functions. In one embodiment, the data store 115 may be able to store sensor data 119 and/or other information that is used by the control module 220.

The data store(s) 115 may include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 may be a component of the processor(s) 110, or the data store(s) 115 may be operatively connected to the processor(s) 110 for use thereby. The term "operatively connected" or "in communication with" as used throughout this description, can include direct or indirect connections, including connections without direct physical contact.

In one or more arrangements, the data store(s) 115 can include sensor data 119. The sensor data 119 can originate from the sensor system 120 of the vehicle 102. The sensor data 119 can include data from visual sensors, audio sensors, road wheel sensors 127, steering wheel sensors 128, and/or any other suitable sensors in the vehicle 102. The sensor data 119 can include the angle(s) of one or more road wheels of the vehicle 102. The sensor data 119 can include the rate of change of the angle(s) of the one or more road wheels. The sensor data 119 can include the angle of the steering wheel of the vehicle 102. The sensor data 119 can include the rate of change of the angle(s) of the steering wheel.

In one or more arrangements, the data store(s) 115 can include vehicle information data 270. The vehicle information data 270 may include information about the vehicle 102. The vehicle information data 270 may include vehicle control input(s) such as road wheel angle input and/or a speed input. The vehicle information data 270 may be from the vehicle control system(s) 160, the ECU, or any suitable control or monitoring system.

In one or more arrangements, the data store(s) 115 can include environment information data 280. The environment information data 280 may include information about the environment surrounding the vehicle 102 such as the location and condition of the path that the vehicle 102 is travelling on. The location of the path(s) may include geographic coordinates of the path. The condition of the path may include information about the physical condition of the path such as the presence of potholes, road debris, and vegetation.

The sensor data 119, the vehicle information data 270, and the environment information data 280 may be digital data that describe information used by the false positive request detection system 100 to control a vehicle control system 160.

In one embodiment, the control module 220 may include instructions that, when executed by the processor(s) 110, cause the processor(s) 110 to detect a false positive request to disengage a vehicle control system 160 based on a difference between a road wheel angle input and an angle of a road wheel controlled by the road wheel angle input and prevent the vehicle control system from disengaging based on detecting the false positive request. The vehicle control system 160 is capable of being disengaged based on the road wheel angle input. In such a case, in response to the road wheel angle input changing by a certain angle value, the presently engaged vehicle control system 160 disengages. As explained further below, the road wheel angle input may be based on a steering wheel input. Additionally and/or alternatively, the road wheel angle input may be based on the ECU.

In one embodiment, the control module 220 continuously monitors one or more road wheels of the vehicle 102. As such, the control module 220 may continuously request and receive sensor data 119 from the road wheel sensor 127. As an example, the sensor data 119 may include an indication that the road wheel has rotated by an angle relative to the longitudinal axis of the vehicle 102. The sensor data 119 may also include the angle of the road wheel relative to the longitudinal axis of the vehicle 102. The sensor data 119 may also include a rate of change of the angle of the road wheel relative to the longitudinal axis of the vehicle 102. In other words, the sensor data 119 may include a rate of rotation of the road wheel relative to the longitudinal axis of the vehicle 102. The sensor data 119 may also include how long the road wheel remained rotated to the angle.

In one embodiment, the control module 220 continuously monitors the road wheel control input. The road wheel is controlled by the road wheel control input. The road wheel control input may control the angle of the road wheel relative to the longitudinal axis of the vehicle 102 and/or the rate of rotation of the road wheel relative to the longitudinal axis of the vehicle 102. Thus, a vehicle system 140 or a vehicle control system 160 may control the steering of the vehicle 102 by controlling the angle of the road wheel relative to the longitudinal axis of the vehicle 102 and/or the rate of rotation of the road wheel relative to the longitudinal axis of the vehicle 102. The road wheel control input may also determine the rate of rotation of the road wheel about an axis perpendicular to the road wheel and through the center mass of the road wheel. Thus, the vehicle system 140 or the vehicle control system 160 may control the speed at which the vehicle 102 is travelling by controlling the rate of rotation of the road wheel about an axis perpendicular to the road wheel and through the center mass of the road wheel.

As an example, a vehicle control system 160 may control the steering of the vehicle 102 by controlling the angle of the road wheel and the rate of change of the angle of the road wheel relative to the longitudinal axis of the vehicle 102 using the road wheel angle input. The vehicle control system 160 may generate a road wheel angle input based on and using any suitable methods. The vehicle control system 160 may then transmit the road wheel angle input to the road wheel. As an example, the vehicle control system 160 may transmit the road wheel angle input to the road wheel through the steering wheel. In such an example, the vehicle control system 160 may control and rotate the steering wheel based on the road wheel angle input and, in response, the road wheel moves according to the road wheel angle input. In another example, the vehicle control system 160 may send the road wheel angle input to the ECU or any other suitable control unit that is capable of controlling the road wheel. In such an example, the ECU or any other suitable control unit may then control the road wheel according to the road wheel angle input.

The control module 220 may request and receive sensor data 119 from the steering wheel sensor 128 and/or cameras monitoring the steering wheel. The sensor data 119 may include the road wheel angle input and/or the rate of change of the road wheel angle input. The control module 220 may request and receive the road wheel angle input and/or the rate of change of the road wheel angle input from the ECU or any suitable control unit capable of controlling the road wheel.

In one or more arrangements where a vehicle control system 160 is presently engaged and can be disengaged by the road wheel angle input, the control module 220 continually receives information indicating whether the road wheel has rotated by an angle relative to the longitudinal axis of the vehicle 102, the angle of the road wheel, the road wheel angle input, and/or the length of time that the wheel remained rotated to the angle. The control module 220 then determines whether the rotation of the road wheel is a positive request to disengage the vehicle control system 160 based on the previously mentioned information.

As an example, the control module 220 determines a first threshold value and a second threshold value which become the predetermined threshold value and the second predetermined threshold value respectively. The control module 220 may determine the first threshold value based on the characteristics of the road that the vehicle 102 is travelling on. As an example, the control module 220 may receive sensor data 119 from cameras on the vehicle 102 indicating that the road is bumpy and has several potholes. The control module 220 may then generate the first threshold value to be an angle that the road wheel may rotate to without triggering the request to disengage the vehicle control system 160. As an example, the control module 220 may generate a first threshold value that is a relatively higher value so as not to capture the road wheel rotating and/or the road wheel and the road wheel angle input being out of alignment due to the bumpy road or a pothole. The control module 220 may generate a first threshold value that is relatively lower value when the vehicle 102 is travelling on a smooth road without any bumps or potholes. As another example, the control module 220 may determine the first threshold value based on the characteristics of the vehicle 102 such the alignment of the road wheel and the road wheel angle input or the suspension system of the vehicle 102. As another example, the control module 220 may determine the first threshold value based on a predetermined setting or a factory setting of the vehicle 102.

The control module 220 determines the second threshold value based on the characteristics of the vehicle 102. As an example, the control module 220 determines the second threshold value based on the factory settings of the vehicle 102. As another example, the control module 220 may determine the second threshold value based on the precision of the vehicle 102. In such an example, the control module 220 may generate a second threshold value that is a lower value for a vehicle 102 that has been calibrated such that there is a relatively high alignment between the angle of the road wheel and the road wheel angle input. In such an example, the angle of the road wheel and the road wheel angle input tend to be the same value during normal vehicle operation. As another example, the control module 220 may generate a second threshold value that is a higher value for a vehicle 102 that has been calibrated such that there is a relatively low alignment between the angle of the road wheel and the road wheel angle input. In such an example, the angle of the road wheel may be slightly higher or slightly lower than the road wheel angle input during normal vehicle operation. As such, the second threshold value may be higher for the vehicle 102 with less alignment between the angle of the road wheel and the road wheel angle input than for the vehicle 102 with more alignment between the angle of the road wheel and the road wheel angle input so as not to capture normal vehicle operation cases. The control module 220 may generate the second threshold value based on any suitable characteristics of the vehicle 102 such as the responsiveness of the vehicle 102, the size of the vehicle 102, and/or the accuracy of the vehicle systems 140.

As previously mentioned, the control module 220 continually receives information indicating whether the road wheel has rotated by an angle relative to the longitudinal axis of the vehicle 102, the angle of the road wheel, and the road wheel angle input. The control module 220 then compares the angle of the road wheel to the first threshold value. In a case where the control module 220 determines that the angle of the road wheel does not exceed the first threshold value, the control module 220 does not disengage the presently engaged vehicle control system 160. In a case where the control module 220 determines that the angle of the road wheel exceeds the first threshold value, the control module 220 proceeds to compare the angle of the road wheel to the road wheel angle input.

The control module 220 receives the angle of the road wheel and the road wheel angle input as previously disclosed. The control module 220 then determines a difference between the angle of the road wheel and the road wheel angle input and compares the difference to the second threshold value. In a case where the control module 220 determines that the difference exceeds the second threshold value, the control module 220 determines that a positive request to disengage the presently engaged vehicle control system 160 has been inputted. In response, the control module 220 disengages the presently engaged vehicle control system 160. In a case where the control module 220 determines that the difference does not exceed the second threshold value, the control module 220 determines that a false positive request has been received and the control module 220 does not respond to the false positive request. As such, the control module 220 does not disengage the presently engaged vehicle control system 160. In other words, the control module 220 prevents the vehicle control system 160 from disengaging based on the false positive request.

In one or more arrangements, the control module 220 continually receives information indicating whether the road wheel has rotated by an angle relative to the longitudinal axis of the vehicle 102, the rate of change of the angle of the road wheel, and the rate of change of the road wheel angle input. The control module 220 then compares the angle of the road wheel to the first threshold value. In a case where the control module 220 determines that the angle of the road wheel does not exceed the first threshold value, the control module 220 does not disengage the presently engaged vehicle control system 160. In a case where the control module 220 determines that the angle of the road wheel exceeds the first threshold value, the control module proceeds to comparing the rate of change of the angle of the road wheel to the rate of change of the road wheel angle input.

The control module 220 receives the rate of change of the angle of the road wheel and the rate of change of the road wheel angle input as previously disclosed. The control module 220 then determines a difference between the rate of change of the angle of the road wheel and the rate of change of the road wheel angle input and compares the difference to a third threshold value. The control module 220 may determine the third threshold value using any suitable methods, and the third threshold value becomes the third predetermined threshold value. Similar to the second threshold value, the control module 220 may determine the third threshold value based on the characteristics of the vehicle 102. In a case where the control module 220 determines that the difference does not exceed the third threshold value, the control module 220 determines that a positive request to disengage the presently engaged vehicle control system 160 has been inputted. In response, the control module 220 disengages the presently engaged vehicle control system 160. In a case where the control module 220 determines that the difference exceeds the third threshold value, the control module 220 determines that a false positive request has been received and the control module 220 does not respond to the false positive request. As such, the control module 220 does not disengage the presently engaged vehicle control system 160. In other words, the control module 220 prevents the vehicle control system 160 from disengaging based on the false positive request.

Figure 3:
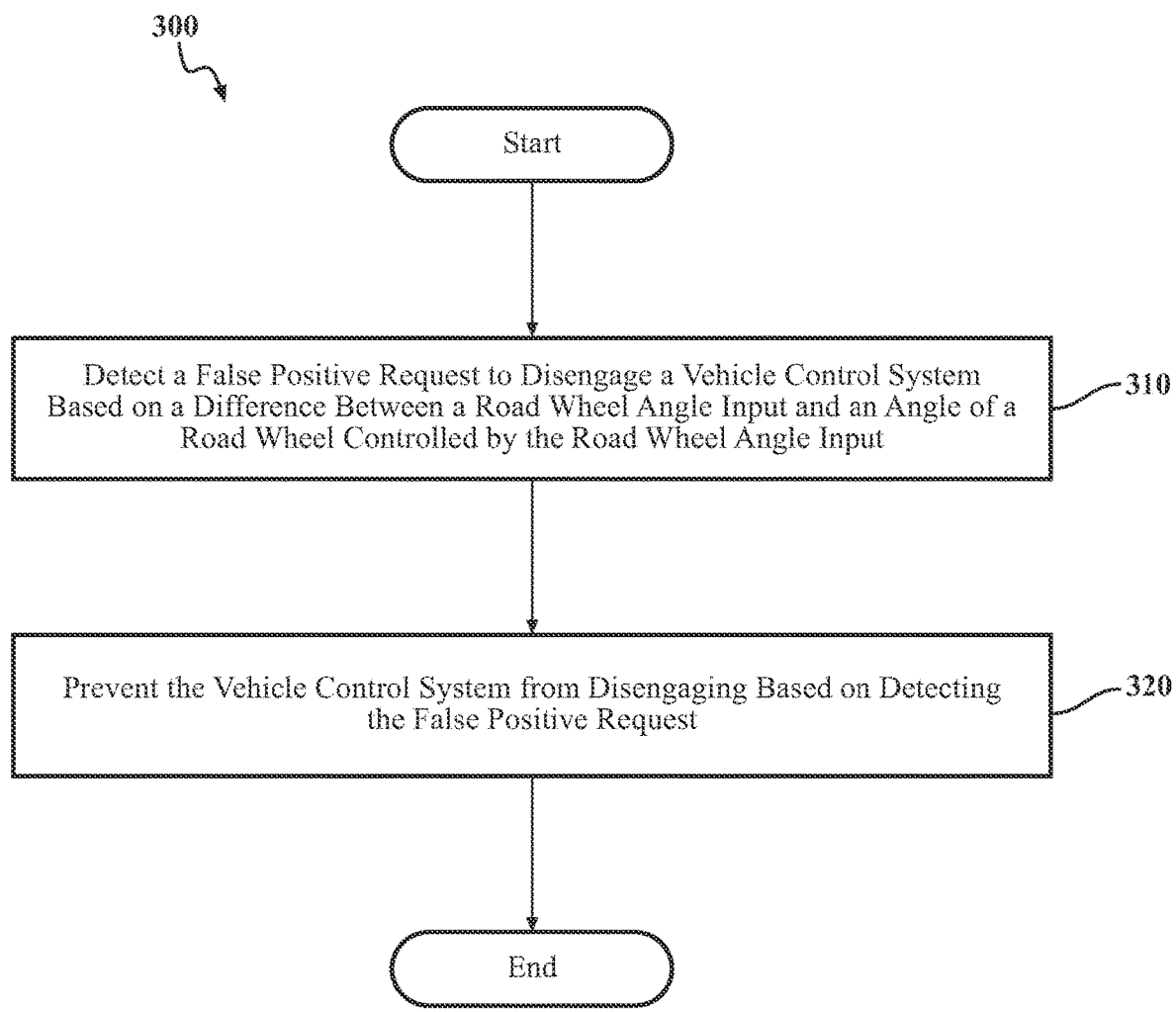
FIG. 3 is an example of a method for detecting a false positive request to disengage a vehicle control system.

FIG. 3 illustrates a method 300 for detecting a false positive request to disengage a vehicle control system 160. The method 300 will be described from the viewpoint of the vehicle 102 of FIG. 1 and the false positive request detection system 100 of FIGS. 1 and 2. However, the method 300 may be adapted to be executed in any one of several different situations and not necessarily by the vehicle 102 of FIG. 1 and/or the false positive request detection system 100 of FIGS. 1 and 2.

At step 310, the control module 220 may cause the processor(s) 110 to detect a false positive request to disengage a vehicle control system 160 based on a difference between a road wheel angle input and an angle of a road wheel controlled by the road wheel angle input. The vehicle control system 160 is capable of disengaging in response to a road wheel angle input. In one embodiment, the road wheel angle input may be based on a steering wheel input. In another embodiment, the road wheel angle input may be based on an ECU.

As previously mentioned, and as an example, the false positive request detection system 100 or more specifically, the control module 220 may receive the road wheel angle input from a steering wheel sensor 128 and the angle of the road wheel controlled by the road wheel input from a road wheel sensor 127. The control module 220 may determine a difference between the road wheel angle input and the angle of the road wheel and determine whether the difference exceeds a predetermined threshold value. The predetermined threshold may be based on characteristics of the vehicle 102 and/or characteristics of the road the vehicle 102 is travelling on.

As another example, the control module 220 may receive the rate of change of the road wheel angle input from the steering wheel sensor 128 and the rate of change of the angle of the road wheel controlled by the road wheel input from the road wheel sensor 127. The control module 220 may determine a difference between the rate of change of the road wheel angle input and the rate of change of the angle of the road wheel and determine whether the difference exceeds the predetermined threshold value. As disclosed above, the predetermined threshold may be based on characteristics of the vehicle 102 and/or characteristics of the road the vehicle 102 is travelling on.

At step 320, the control module 220 may cause the processor(s) 110 to prevent the vehicle control system 160 from disengaging based on detecting the false positive request. As an example, the control module 220 may determine that the difference between the road wheel angle input and the angle of the road wheel exceeds the predetermined threshold value and, in response, may prevent the vehicle control system 160 from disengaging. As another example, the control module 220 may determine that the difference between the rate of change of the road wheel angle input and the rate of change of the angle of the road wheel exceeds the predetermined threshold value and, in response, may prevent the vehicle control system 160 from disengaging.

As another example, the control module 220 may determine that the difference between the road wheel angle input and the angle of the road wheel is between the predetermined threshold value and a second predetermined threshold value, where the second predetermined threshold value is larger than the predetermined threshold value. In such an example, the control module 220 may determine the rotation of the road wheel to be a false positive and thus, prevent the vehicle control system 160 from disengaging. As another example, the control module 220 may determine that the difference between the road wheel angle input and the angle of the road wheel exceeds the second predetermined threshold value. In such an example, the control module 220 may determine the rotation of the road wheel to be a true positive and thus, disengage the vehicle control system 160.

Figure 4A:
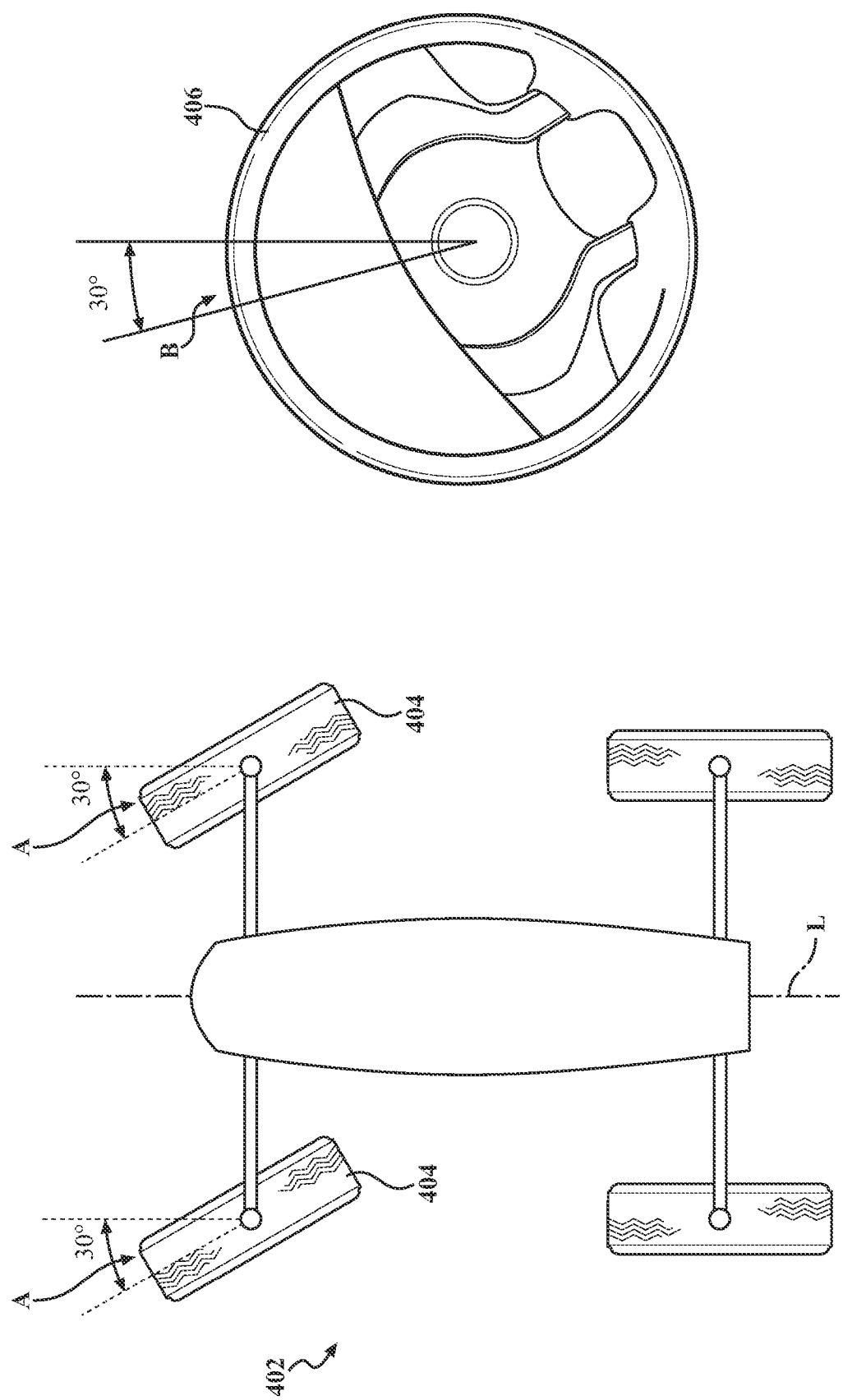
FIGS. 4A-4B are an example of a false positive request detection scenario.
Figure 4B:
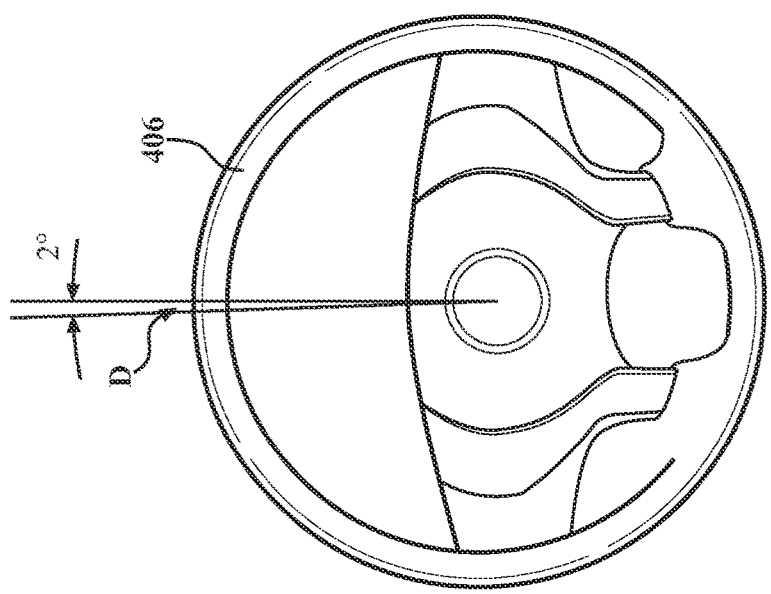
Figure 4B:
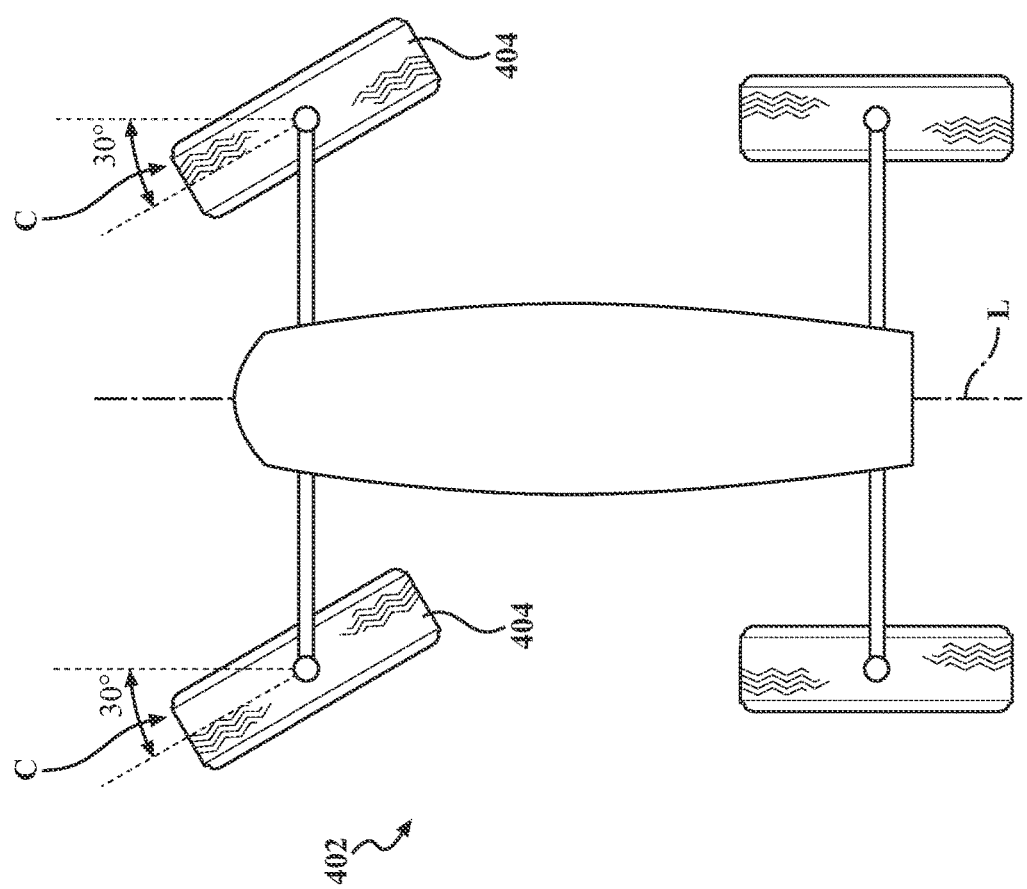

A non-limiting example of the operation of the false positive request detection system 100 and/or one or more of the methods will now be described in relation to FIGS. 4A-4B. FIGS. 4A-4B show an example of a false positive request detection scenario.

FIGS. 4A-4B show a vehicle 402 that includes a vehicle control system 160, the lane keeping assist system 162, which is presently activated and engaged in controlling the vehicle 402. The vehicle 402 includes the false positive request detection system 100 and is similar to the vehicle 102 described above.

As shown in FIG. 4A, the vehicle 402 is traveling along and the two front road wheels 404 turn at an angle A relative to the longitudinal axis L of the vehicle 402. The false positive request detection system 100 or more specifically, the control module 220 receives the angle A of the road wheels 404 from the road wheel sensor 127 and the angle B of the steering wheel 406, which is the road wheel angle input, from the steering wheel sensor 128. The control module 220 determines a difference between the angle A of the road wheel 404, which is 30 degrees and the angle B of the steering wheel 406, which is also 30 degrees. The control module 220 then compares the difference of zero to a predetermined threshold value of 20 degrees. In this example, the control module 220 determines that the difference does not exceed the predetermined threshold value and permits the vehicle control system 160 to disengage. As such, the vehicle control system 160 becomes disengaged and no longer active.

As shown in FIG. 4B, the vehicle 402 is traveling along and the two front road wheels 404 turn at an angle C relative to the longitudinal axis L of the vehicle 402. The false positive request detection system 100 or more specifically, the control module 220 receives the angle C of the road wheel 404 from the road wheel sensor 127 and the angle D of the steering wheel 406, which is the road wheel angle input, from the steering wheel sensor 128. The control module 220 determines a difference between the angle C of the road wheel 404, which is 30 degrees and the angle D of the steering wheel 406, which is 2 degrees. The control module then compares the difference of 28 degrees to a predetermined threshold value of 20 degrees. In this example, the control module 220 determines that the difference exceeds the predetermined threshold value and prevents the vehicle control system 160 from disengaging. As such, the vehicle control system 160 remains engaged and active.

FIG. 1 will now be discussed in full detail as an example environment within which the system and methods disclosed herein may operate. In some instances, the vehicle 102 is configured to switch selectively between an autonomous mode, one or more semi-autonomous operational modes, and/or a manual mode. Such switching can be implemented in a suitable manner, now known, or later developed. "Manual mode" means that all of or a majority of the navigation and/or maneuvering of the vehicle is performed according to inputs received from a user (e.g., human driver). In one or more arrangements, the vehicle 102 can be a conventional vehicle that is configured to operate in only a manual mode.

In one or more embodiments, the vehicle 102 is an autonomous vehicle. As used herein, "autonomous vehicle" refers to a vehicle that operates in an autonomous mode. "Autonomous mode" refers to navigating and/or maneuvering the vehicle 102 along a travel route using one or more computing systems to control the vehicle 102 with minimal or no input from a human driver. In one or more embodiments, the vehicle 102 is highly automated or completely automated. In one embodiment, the vehicle 102 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 102 along a travel route.

The vehicle 102 can include one or more processors 110. In one or more arrangements, the processor(s) 110 can be a main processor of the vehicle 102. For instance, the processor(s) 110 can be an electronic control unit (ECU). The vehicle 102 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

The one or more data stores 115 can include sensor data 119. In this context, "sensor data" means any information about the sensors that the vehicle 102 is equipped with, including the capabilities and other information about such sensors. As will be explained below, the vehicle 102 can include the sensor system 120. The sensor data 119 can relate to one or more sensors of the sensor system 120. As an example, in one or more arrangements, the sensor data 119 can include information on one or more vehicle sensors 121 and/or environment sensors 122 of the sensor system 120.

In some instances, at least a portion of the map data 116 and/or the sensor data 119 can be located in one or more data stores 115 located onboard the vehicle 102. Alternatively, or in addition, at least a portion of the map data 116 and/or the sensor data 119 can be located in one or more data stores 115 that are located remotely from the vehicle 102.

As noted above, the vehicle 102 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 102 (including any of the elements shown in FIG. 1). The sensor system 120 can acquire data of at least a portion of the internal environment as well as the external environment of the vehicle 102 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 102 itself. In one or more arrangements, the vehicle sensor(s) 121 can be configured to detect, and/or sense position and orientation changes of the vehicle 102, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), and/or other suitable sensors. The vehicle sensor(s) 121 can be configured to detect, and/or sense one or more characteristics of the vehicle 102. In one or more arrangements, the vehicle sensor(s) 121 can include a road wheel sensor 127 that detects the angle of the road wheel and/or the rate of change of the angle of the road wheel. The vehicle sensor(s) 121 can include a steering wheel sensor 128 that detects the angle of the steering wheel and/or the rate of change of the angle of the steering wheel.

Alternatively, or in addition, the sensor system 120 can include one or more environment sensors 122 configured to acquire, and/or sense data inside the vehicle as well as around the vehicle. Sensor data inside the vehicle can include information about one or more users in the vehicle cabin and any other objects of interest. Sensor data around the vehicle can include information about the external environment in which the vehicle is located or one or more portions thereof.

As an example, the one or more environment sensors 122 can be configured to detect, quantify and/or sense objects in at least a portion of the internal and/or the external environment of the vehicle 102 and/or information/data about such objects.

In the internal environment of the vehicle 102, the one or more environment sensors 122 can be configured to detect, measure, quantify, and/or sense human users inside the vehicle 102 and the facial expressions of the users. In the external environment, the one or more environment sensors 122 can be configured to detect, measure, quantify, and/or sense objects in the external environment of the vehicle 102, such as, for example, lane markers, signs, traffic lights, traffic signs, lane lines, crosswalks, curbs proximate the vehicle 102, off-road objects, electronic roadside devices, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 102 can include an input system 130. An "input system" includes any device, component, system, element or arrangement or groups thereof that enable information/data to be entered into a machine. The input system 130 can receive an input from a user (e.g., a driver or a passenger). The vehicle 102 can include an output system 135. An "output system" includes any device, component, or arrangement or groups thereof that enable information/data to be presented to a user (e.g., a person, a vehicle passenger, etc.) such as a display interface.

The vehicle 102 can include one or more vehicle systems 140. Various examples of the one or more vehicle systems 140 are shown in FIG. 1. However, the vehicle 102 can include more, fewer, or different vehicle systems 140. It should be appreciated that although particular vehicle systems are separately defined, each or any of the systems or portions thereof may be otherwise combined or segregated via hardware and/or software within the vehicle 102. The vehicle 102 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 102 and/or to determine a travel route for the vehicle 102. The navigation system 147 can include one or more mapping applications to determine a travel route for the vehicle 102. The navigation system 147 can include a global positioning system, a local positioning system or a geolocation system.

As previously mentioned, the vehicle 102 can include one or more vehicle control systems 160. The vehicle control system(s) 160 can be configured to receive data from the sensor system 120 and/or any other type of system capable of capturing information relating to the vehicle 102 and/or the external environment of the vehicle 102. In one or more arrangements, the vehicle control system(s) 160 can use such data to generate one or more driving scene models. The vehicle control system(s) 160 can determine position and velocity of the vehicle 102. The vehicle control system(s) 160 can determine the location of obstacles, obstacles, or other environmental features including traffic signs, trees, shrubs, neighboring vehicles, pedestrians, etc.

The vehicle control system(s) 160 can be configured to receive, and/or determine location information for obstacles within the external environment of the vehicle 102 for use by the processor(s) 110, and/or one or more of the modules described herein to estimate position and orientation of the vehicle 102, vehicle position in global coordinates based on signals from a plurality of satellites, or any other data and/or signals that could be used to determine the current state of the vehicle 102 or determine the position of the vehicle 102 with respect to its environment for use in either creating a map or determining the position of the vehicle 102 in respect to map data.

The vehicle control system(s) 160 can be configured to determine travel path(s), current autonomous driving maneuvers for the vehicle 102, future autonomous driving maneuvers and/or modifications to current autonomous driving maneuvers based on data acquired by the sensor system 120, driving scene models, and/or data from any other suitable source such as determinations from the sensor data 119. "Driving maneuver" means one or more actions that affect the movement of a vehicle. Examples of driving maneuvers include accelerating, decelerating, braking, turning, moving in a lateral direction of the vehicle 102, changing travel lanes, merging into a travel lane, and/or reversing, just to name a few possibilities. The vehicle control system(s) 160 can be configured to implement determined driving maneuvers. The vehicle control system(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The vehicle control system(s) 160 can be configured to execute various vehicle functions and/or to transmit data to, receive data from, interact with, and/or control the vehicle 102 or one or more systems thereof (e.g., one or more of vehicle systems 140).

The processor(s) 110, the false positive request detection system 100, and/or the vehicle control system(s) 160 can be operatively connected to communicate with the various vehicle systems 140 and/or individual components thereof. For example, returning to FIG. 1, the processor(s) 110, the false positive request detection system 100, and/or the vehicle control system(s) 160 can be in communication to send and/or receive information from the various vehicle systems 140 to control the movement, speed, maneuvering, heading, direction, etc. of the vehicle 102. The processor(s) 110, the false positive request detection system 100, and/or the vehicle control system(s) 160 may control some or all of these vehicle systems 140 and, thus, may be partially or fully autonomous.

The processor(s) 110, the false positive request detection system 100, and/or the vehicle control system(s) 160 may be operable to control the navigation and/or maneuvering of the vehicle 102 by controlling one or more of the vehicle systems 140 and/or components thereof. As an example, when operating in an autonomous mode, the processor(s) 110, the false positive request detection system 100, and/or the vehicle control system(s) 160 can control the direction and/or speed of the vehicle 102. As another example, the processor(s) 110, the false positive request detection system 100, and/or the vehicle control system(s) 160 can activate, deactivate, and/or adjust the parameters (or settings) of the one or more driver assistance systems. The processor(s) 110, the false positive request detection system 100, and/or the vehicle control system(s) 160 can cause the vehicle 102 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 102 can include one or more actuators 150. The actuators 150 can be any element or combination of elements operable to modify, adjust and/or alter one or more of the vehicle systems 140 or components thereof. Any suitable actuator can be used. For instance, the one or more actuators 150 can include motors, pneumatic actuators, hydraulic pistons, relays, solenoids, and/or piezoelectric actuators, just to name a few possibilities.

The vehicle 102 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method comprising:
   detecting a false positive request to disengage a vehicle control system based on whether:
      a rate of change of angle of a road wheel exceeds a predetermined threshold value, the road wheel being controlled by a road wheel angle input; and
      a difference between the road wheel angle input and an angle of the road wheel exceeds a second predetermined threshold value; and
   preventing the vehicle control system from disengaging based on detecting the false positive request.

2. The method of claim 1, wherein the vehicle control system is capable of being disengaged based on the road wheel angle input.

3. The method of claim 1, wherein the difference is based on a position of the road wheel angle input and a position of the angle of the road wheel.

4. The method of claim 1, wherein the difference is based on a rate of change of the road wheel angle input and a rate of change of the angle of the road wheel.

5. The method of claim 1, further comprising:
   detecting the false positive request based on at least one of: a characteristic of a vehicle and a characteristic of a road, wherein the vehicle includes the vehicle control system, and wherein the vehicle is travelling on the road.

6. The method of claim 1, wherein the road wheel angle input is based on a steering wheel input.

7. The method of claim 1, wherein the road wheel angle input is based on an electronic control unit (ECU).

8. A system comprising:
a processor; and
a memory storing machine-readable instructions that, when executed by the processor, cause the processor to:
  detect a false positive request to disengage a vehicle control system based on whether:
    a rate of change of angle of a road wheel exceeds a predetermined threshold value, the road wheel being controlled by a road wheel angle input; and
    a difference between the road wheel angle input and an angle of the road wheel exceeds a second predetermined threshold value; and
  prevent the vehicle control system from disengaging based on detecting the false positive request.

9. The system of claim 8, wherein the vehicle control system is capable of being disengaged based on the road wheel angle input.

10. The system of claim 8, wherein the difference is based on a position of the road wheel angle input and a position of the angle of the road wheel.

11. The system of claim 8, wherein the difference is based on a rate of change of the road wheel angle input and a rate of change of the angle of the road wheel.

12. The system of claim 8, wherein the machine-readable instructions further include instructions that when executed by the processor cause the processor to:
detect the false positive request based on at least one of:
  a characteristic of a vehicle and a characteristic of a road, wherein the vehicle includes the vehicle control system, and wherein the vehicle is travelling on the road.

13. The system of claim 8, wherein the road wheel angle input is based on a steering wheel input.

14. The system of claim 8, wherein the road wheel angle input is based on an electronic control unit (ECU).

15. A non-transitory computer-readable medium including instructions that when executed by a processor cause the processor to:
detect a false positive request to disengage a vehicle control system based on whether:
  a rate of change of angle of a road wheel exceeds a predetermined threshold value, the road wheel being controlled by a road wheel angle input; and
  a difference between the road wheel angle input and an angle of the road wheel exceeds a second predetermined threshold value; and
prevent the vehicle control system from disengaging based on detecting the false positive request.

16. The non-transitory computer-readable medium of claim 15, wherein the vehicle control system is capable of being disengaged based on the road wheel angle input.

17. The non-transitory computer-readable medium of claim 15, wherein the difference is based on a position of the road wheel angle input and a position of the angle of the road wheel.

18. The non-transitory computer-readable medium of claim 15, wherein the difference is based on a rate of change of the road wheel angle input and a rate of change of the angle of the road wheel.

19. The non-transitory computer-readable medium of claim 15, wherein the instructions further include instructions that when executed by the processor cause the processor to:
detect the false positive request based on at least one of:
  a characteristic of a vehicle and a characteristic of a road, wherein the vehicle includes the vehicle control system, and wherein the vehicle is travelling on the road.

20. The non-transitory computer-readable medium of claim 15, wherein the road wheel angle input is based on a steering wheel input.

* * * * *